March 20, 1928.
J. T. MURRY ET AL
1,663,277
APPARATUS FOR HARVESTING STUMPS
Filed Feb. 15, 1927
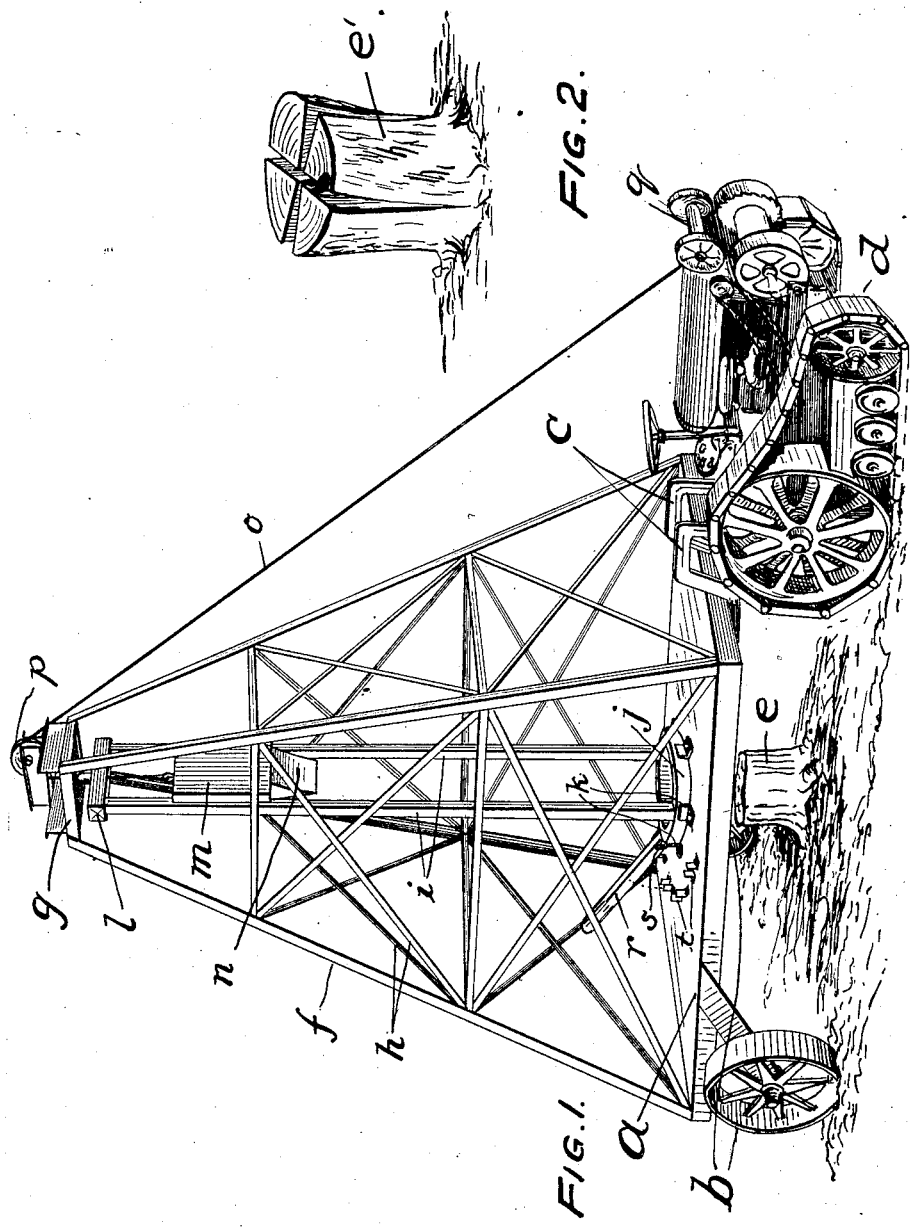
WITNESS:
INVENTORS
Jasper T. Murry and
Clare B. Patterson
BY
ATTORNEYS.

Patented Mar. 20, 1928.

1,663,277

UNITED STATES PATENT OFFICE.

JASPER T. MURRY AND CLARE B. PATTERSON, OF HATTIESBURG, MISSISSIPPI, ASSIGNORS TO HERCULES POWDER COMPANY, OF WILMINGTON, DELAWARE, A CORPORATION OF DELAWARE.

APPARATUS FOR HARVESTING STUMPS.

Application filed February 15, 1927. Serial No. 168,271.

Our invention relates to improved means for facilitating the harvesting of stumps, such, for example, as are used as a source of naval stores.

In connection with the production of naval stores, such as turpentine, rosin, etc. a valuable source of raw material is comprised in pine stumps, which are found in large cut over areas from which the pine timber has been removed. In the usual process for the production of naval stores from pine stumps the stumps are harvested, transported to a plant, reduced to chips, which are digested with steam for the removal of turpentine therefrom, and finally extracted with gasoline for the recovery of rosin.

While pine stumps are recognized as an excellent source of naval stores, the harvesting of the stumps from cut over areas with economy has heretofore presented a substantial problem, since the stumps, usually of substantial size, are tenaciously held to the ground by their roots and their removal is a difficult and more or less expensive proceeding. Heretofore the stumps have been removed by stump pullers and by the use of dynamite. However, the stump puller is unsatisfactory and often when the stumps are large, ineffective, while the use of dynamite is relatively expensive and hazardous, especially when, as is usually the case, unskilled labor is employed.

Now it is the object of our invention to provide means whereby the harvesting of stumps may be accomplished in a simple and efficient manner and without any hazard to the labor employed and at a minimum of expense in time and labor.

Having now indicated, in a general way, the nature and purpose of our invention, we will proceed to a detailed description thereof with reference to the accompanying drawing in which there is illustrated a preferred embodiment of our invention and in which:—

Fig. 1 is a perspective view of an apparatus embodying our invention.

Fig. 2 is a perspective view of a stump split up by the apparatus shown in Fig. 1.

The apparatus shown in Fig. 1 comprises a platform $a$ mounted at its rear end upon a pair of wheels $b$, or suitable caterpillar treads, and provided at its forward end with a bracket $c$ adapted to be pivotally secured to the pitch at the rear of a tractor $d$. The wheels $b$ are of such a diameter and the bracket $c$ is so formed that the platform $a$ will be supported substantially horizontal to the ground and at a distance from the ground sufficient to pass over the usual stump $e$, as shown in Fig. 1.

Mounted on the platform $a$ is a derrick comprising four posts $f$ extending from the corners of the platform and connected to a crown piece $g$. The posts $f$ are cross-braced by means of brace members $h$. A pair of vertical members $i$ extend from a circular base $j$, which rests on the platform concentric with a hole formed therein and which is rotatable thereon within stops $k$, which act to position it. The members $i$ are connected at the upper ends to a cross member $l$, which is pivotally connected to the crown piece $g$. A heavy weight $m$ having a wedge like blade $n$ formed on its lower end is slidably mounted between the vertical members $i$ and is adapted to be raised by means of a cable $o$ secured to its upper end and which passes through the crown piece $g$ over a pulley $p$ mounted on the crown piece and from thence to a winch $q$ mounted on the tractor and adapted to be operated by the tractor engine. The winch is so controlled as to be released when the weight $m$ is in upper position to permit the weight to drop under the influence of gravity.

In the operation of the apparatus described, the platform $a$ is drawn by the tractor to a position with the hole, formed therein within the base $j$, over a stump. The weight $m$ is raised by the operation of the winch $q$ which is then released permitting the weight, guided by the members $i$, to drop. The weight drops through the hole in the platform, which is of a size to permit the passage of the weight, and the blade $n$ will be driven into the stump, splitting it into two parts.

The weight is then again raised by operation of the winch which has sufficient power to withdraw the blade from the split stump. After the weight has been raised, the weight and base $j$ are rotated, say 90° by means of a handspring $r$ pivotally attached to the base $j$, as at $s$, and adapted after the weight is adjusted to be dropped between lugs $t$ secured to the platform and which act to prevent rotation of the base after adjustment. Lugs $t$ may be variously positioned to enable various adjustments of the directions of extension of the blade to be made. After adjustment the weight is again permitted to drop and drive the blade *n* into the stump with the result that each of the two parts into which the stump was previously split are split into two parts, the stump being thus quartered as shown in the stump *e'*, Fig. 2.

Ordinarily the quartering of the stump, as described, is sufficient to enable removal of the parts, which may be accomplished by an ordinary stump puller, or the platform having been drawn away the tractor may be unhitched therefrom and the winch *q* used for removing the quarters of the stump.

If the stump to be removed be of excessive size, or if desirable for any reason, the blade may be utilized, as is obvious, for splitting the stump into any number of sections desired.

Having now fully described our invention, what we claim and desire to protect by Letters Patent is:—

1. In an apparatus for harvesting stumps, in combination, a platform, means for supporting the platform substantially horizontal to and at a distance from the ground and permitting the platform to be moved from place to place, a base rotatable relatively to said platform, guide members extending from said base, a blade engaged by said guide members and means for raising said blade to a height and for permitting it to drop by gravity, said platform being apertured within the confines of said rotatable base to permit said blade to pass therethrough.

2. In an apparatus for harvesting stumps, in combination, a tractor, a platform, a pair of wheels adapted to support said platform at one end, a bracket secured to said platform at its other end and adapted for connection with the tractor, a derrick including a crown piece mounted on said platform, a rotatable base mounted on said platform beneath the crown piece of said derrick, a cross member pivotally hung from the crown piece of said derrick members, a pair of guides secured to said cross member, a weighted blade positioned between and engaging said guide members, a pulley mounted on said derrick adjacent its top, a hoist on the tractor, a cable secured to said blade and extended over said pulley to said hoist whereby said blade may be hoisted to adjacent the top of the derrick and means whereby said hoist may be released to permit said blade to drop under the influence of gravity, said platform being apertured within the confines of said rotatable base for the passage of said blade.

In testimony of which invention, we have hereunto set our hands, at Hattiesburg, Mississippi, on this 22nd day of January, 1927.

JASPER T. MURRY.
CLARE B. PATTERSON.